United States Patent
Watanabe (10) Patent No.: US 8,589,416 B2
(45) Date of Patent: Nov. 19, 2013

(54) SYSTEM AND METHOD OF PERFORMING DATA PROCESSING ON SIMILAR FORMS

(75) Inventor: Tsuyoshi Watanabe, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 34 days.

(21) Appl. No.: 12/751,447

(22) Filed: Mar. 31, 2010

(65) Prior Publication Data

US 2011/0176735 A1 Jul. 21, 2011

(30) Foreign Application Priority Data

Jan. 20, 2010 (JP) ................................. 2010-009935

(51) Int. Cl.
G06F 19/24 (2011.01)
G06F 19/00 (2011.01)

(52) U.S. Cl.
USPC ........... 707/749; 707/736; 715/226; 715/255; 715/838

(58) Field of Classification Search
None
See application file for complete search history.

(56) References Cited

U.S. PATENT DOCUMENTS

| 7,370,034 B2* | 5/2008 | Franciosa et al. | 707/749 |
| 7,487,438 B1* | 2/2009 | Withers | 715/223 |
| 2010/0174724 A1* | 7/2010 | Wallace et al. | 707/749 |

FOREIGN PATENT DOCUMENTS

| JP | 11-259597 A | 9/1999 |
| JP | 2000-057266 A | 2/2000 |
| JP | 2000-285190 A | 10/2000 |

* cited by examiner

*Primary Examiner* — Stephen Hong
*Assistant Examiner* — Keith Bloomquist
(74) *Attorney, Agent, or Firm* — Sughrue Mion, PLLC (57) ABSTRACT

A form identification apparatus includes a form registration unit and a candidate registered form extracting unit. The form registration unit registers stylized forms as registered forms, and sets, for each of the registered forms, content of form processing and a threshold for determining a degree of difference in accordance with the content of the form processing. The candidate registered form extracting unit extracts, as a candidate registered form, the registered forms in which content of form processing executable on a to-be-processed form has been set, based on a degree of difference between an image of the to-be-processed form and an image of each of the registered forms and the threshold.

11 Claims, 10 Drawing Sheets

SYSTEM AND METHOD OF PERFORMING DATA PROCESSING ON SIMILAR FORMS

CROSS-REFERENCE TO RELATED APPLICATIONS

This application is based on and claims priority under 35 USC 119 from Japanese Patent Application No. 2010-009935 filed on Jan. 20, 2010.

BACKGROUND

1. Technical Field

The present invention relates to a form identification apparatus, a form processing system, a form processing method and a computer readable medium.

2. Related Art

There are disclosed techniques for identifying, of a plurality of registered forms registered in advance, which form a form written on a paper medium or the like corresponds to.

SUMMARY

According to an aspect of the invention, a form identification apparatus includes a form registration unit and a candidate registered form extracting unit. The form registration unit registers stylized forms as registered forms, and sets, for each of the registered forms, content of form processing and a threshold for determining a degree of difference in accordance with the content of the form processing. The candidate registered form extracting unit extracts, as a candidate registered form, the registered forms in which content of form processing executable on a to-be-processed form has been set, based on a degree of difference between an image of the to-be-processed form and an image of each of the registered forms and the threshold.

BRIEF DESCRIPTION OF THE DRAWINGS

Exemplary embodiment(s) of the present invention will be described in detail based on the following figures, wherein.

DETAILED DESCRIPTION

Exemplary embodiments of the invention will be described below with reference to the drawings.

First Exemplary Embodiment

Figure 1:
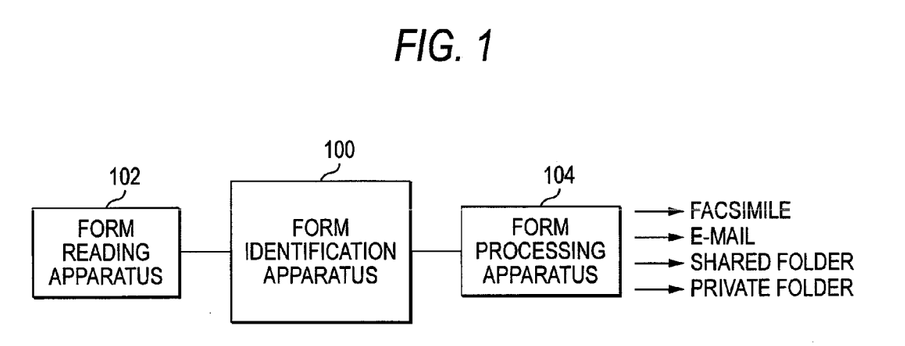
FIG. 1 is a diagram showing an example of a configuration of a form processing system according to an exemplary embodiment.

FIG. 1 shows an example of a configuration of a form processing system according to an exemplary embodiment. In FIG. 1, the form processing system is designed to include a form identification apparatus 100, a form reading apparatus 102 and a form processing apparatus 104.

The form identification apparatus 100 receives a to-be-processed form from the form reading apparatus 102 or the like. The to-be-processed form is a target of form processing. The form identification apparatus 100 obtains a degree of difference between the to-be-processed form and each registered form which has been registered. Thus, the form identification apparatus 100 identifies a registered form in which content of form processing executable on the to-be-processed form has been set. A threshold for determining a degree of difference is used for the identification process. The threshold is set for each registered form in accordance with the content of form processing thereof. That is, a degree of difference between the to-be-processed form and each registered form is obtained in a method which will be described later, and any registered form whose degree of difference is smaller than the threshold is extracted as a candidate registered form. Of the candidate registered forms extracted thus, a registered form in which the content of set form processing can be executed on the to-be-processed form is identified based on user's instruction or the magnitude of the degree of difference.

The form reading apparatus 102, for example, includes a scanner or the like to read images of a to-be-processed form which will be a target of form processing, stylized forms to be registered as registered forms, etc., and outputs the images as raster images to the form identification apparatus 100.

The form processing apparatus 104 is an apparatus executing the content of form processing which has been set in the registered form identified by the form identification apparatus 100, on the to-be-processed form. The contents of form processing include facsimile transmission, transmission as attachment to e-mail, storage into a shared folder, storage into a private folder, print output, etc. The contents of form processing are not limited thereto, but may be decided suitably in accordance with the kind of form. A level of safety required for one form processing in accordance with the content of the processing differs from that of another. The aforementioned threshold depends on the level of safety required for each form processing.

The form identification apparatus 100, the form reading apparatus 102 and the form processing apparatus 104 may be connected to one another through a network or any other communication means so as to operate in cooperation with one another. In addition, the form identification apparatus 100, the form reading apparatus 102 and the form processing apparatus 104 may be incorporated in a copying machine, a facsimile machine, a scanner, a complex machine (also called a multifunctional copying machine, having functions as a scanner, a printing machine, a copying machine, a facsimile machine, etc.) or the like.

Figure 2:
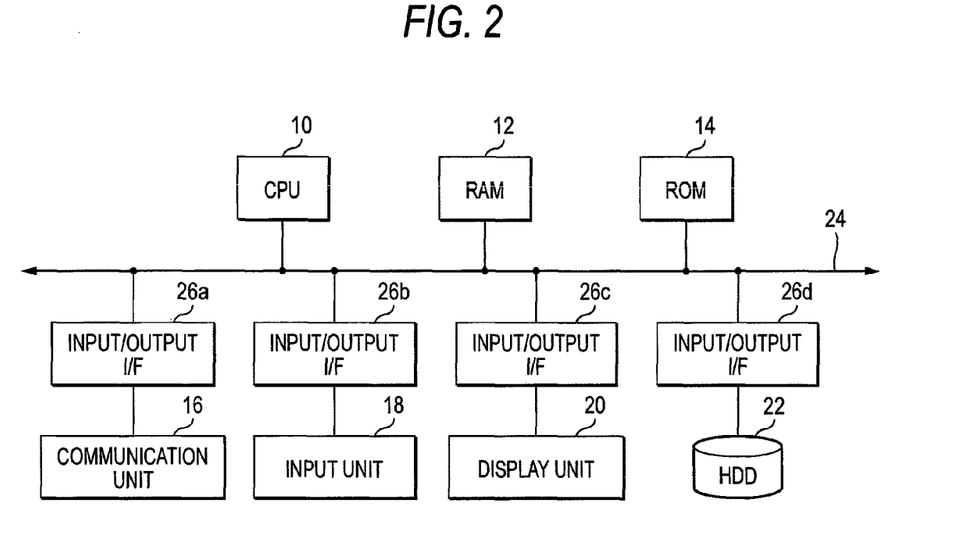
FIG. 2 is a diagram showing an example of a hardware configuration of a computer constituting a form identification apparatus according to an exemplary embodiment.

FIG. 2 shows an example of a hardware configuration of a computer constituting a form identification apparatus according to an exemplary embodiment. In FIG. 2, the form identification apparatus includes a central processing unit (for example, an CPU such as a microprocessor may be used) 10, a random access memory (RAM) 12, a read only memory (ROM) 14, a communication unit 16, an input unit 18, a display unit 20 and a hard disk drive (HDD) 22. In addition, these constituent elements are connected to one another through a bus 24. The communication unit 16, the input unit 18, the display unit 20 and the hard disk drive 22 are connected to the bus 24 through input/output interfaces 26a, 26b, 26c and 26d respectively.

The CPU 10 controls operation of each portion, which will be described later, based on control programs stored in the RAM 12 or the ROM 14. The RAM 12 mainly serves as a work area for the CPU 10, and control programs including BIOS and other data to be used by the CPU 10 are stored in the ROM 14.

In addition, the communication unit 16 is constituted by a USB (Universal Serial Bus) port, a network port or another suitable interface. The CPU 10 uses the communication unit 16 to exchange data with an external apparatus through a communication means such as a network. For example, the communication unit 16 communicates with the form reading apparatus 102 and the form processing apparatus 104.

In addition, the input unit 18 is constituted by a keyboard, a pointing device, a touch panel, or the like. A user uses the input unit 18 to input an operation instruction or the like.

In addition, the display unit 20 is constituted by a liquid crystal display, a touch panel, or the like. The display unit 20 displays a result of processing by the CPU 10, or the like.

In addition, the hard disk drive 22 is a storage unit, which stores various data required for processing which will be described later. The data include the aforementioned registered forms, the thresholds, etc. Incidentally, a nonvolatile storage device such as an EEPROM may be used in place of the hard disk drive.

Figure 3:
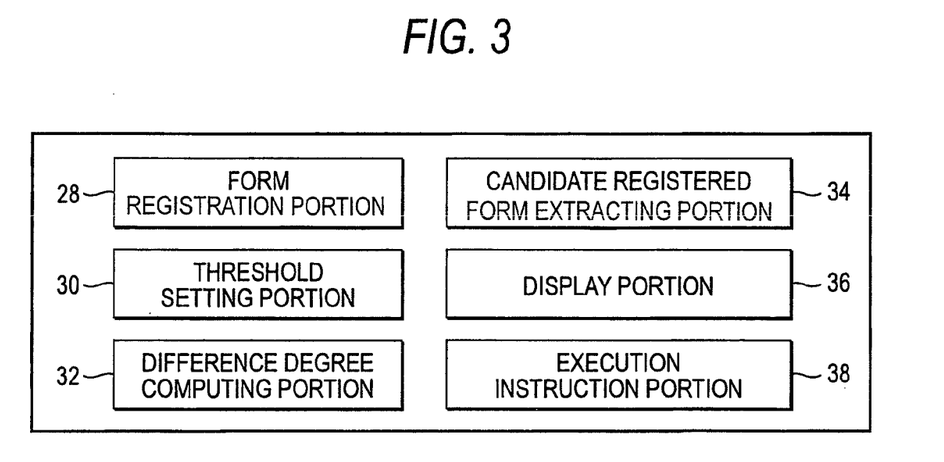
FIG. 3 is a functional block diagram of the form identification apparatus according to the exemplary embodiment.

FIG. 3 shows a functional block diagram of the form identification apparatus according to the exemplary embodiment. In FIG. 3, the form identification apparatus includes a form registration portion 28, a threshold setting portion 30, a difference degree computing portion 32, a candidate registered form extracting portion 34, a display portion 36 and an execution instruction portion 38. These functions are, for example, implemented by the CPU 10 and programs for controlling the processing operation of the CPU 10.

The form registration portion 28 stores image data of stylized forms (raster images generated by the form reading apparatus 102 or the like) as registered forms into a storage unit such as the hard disk drive 22. In each of the registered forms, content of form processing to be performed on the same kind of form as the registered form is set and stored in the storage unit such as the hard disk drive 22 together with the image data thereof. The content of form processing can be inputted from the input unit 18 by the user. In addition, a table in which the stylized forms are associated with the contents of form processing respectively may be in advance created and stored in the storage unit such as the hard disk drive 22. In this case, when the form registration portion 28 registers (stores in the storage unit) any stylized form as a registered form, the content of form processing is set with reference to the table.

The threshold setting portion 30 sets a difference degree determination threshold in accordance with the content of form processing for each registered form whose content of form processing has been set. The threshold setting portion 30 stores the threshold into the storage unit such as the hard disk drive 22. The degree of difference is a degree of difference between a registered form and a to-be-processed form on which the content of form processing set for the registered form should be executed. The degree of difference is computed by the difference degree computing portion 32 which will be described later. In addition, the degree of difference is determined by the candidate registered form extracting portion 34 which will be described later. The threshold set by the threshold setting portion 30 depends on the level of safety required for the form processing set for each registered form. For example, when the form processing implies storage into a private folder, the required level of safety is not so high. Therefore, the threshold is set to be a large value. On the other hand, when the form processing implies transmission to the outside such as facsimile transmission or transmission as attachment to e-mail, the required level of safety is high. Thus, the threshold is set to be a small value. The threshold is set based on a value inputted from the input unit 18 by the user.

The difference degree computing portion 32 computes a degree of difference between an image of each of the registered forms and an image of the to-be-processed form. Feature values are obtained from the raster images of the registered form and the to-be-processed form received from the form reading apparatus 102 or the like, respectively. The degree of difference is computed by comparison between the feature values. For example, the feature values include positions, widths, lengths, etc. of ruled lines belonging to the registered form and the to-be-processed form. Preferably the feature value of each registered form is computed and stored in the storage unit such as the hard disk drive 22 in advance when the registered form is registered by the form registration portion 28.

Figure 4A:
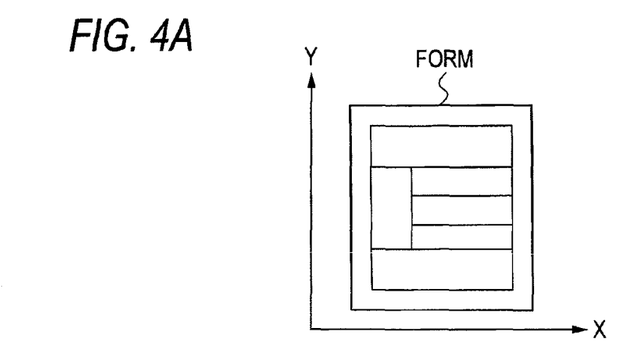
FIGS. 4A to 4C are explanatory diagrams of specific examples of arithmetic operation for obtaining a degree of difference.
Figure 4B:
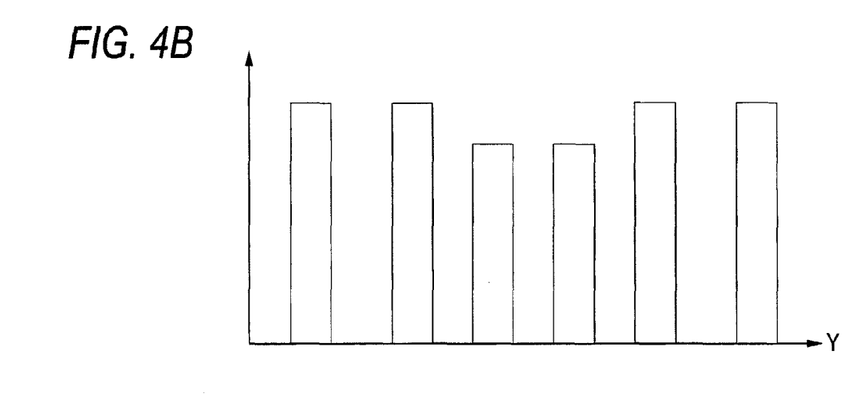
Figure 4C:
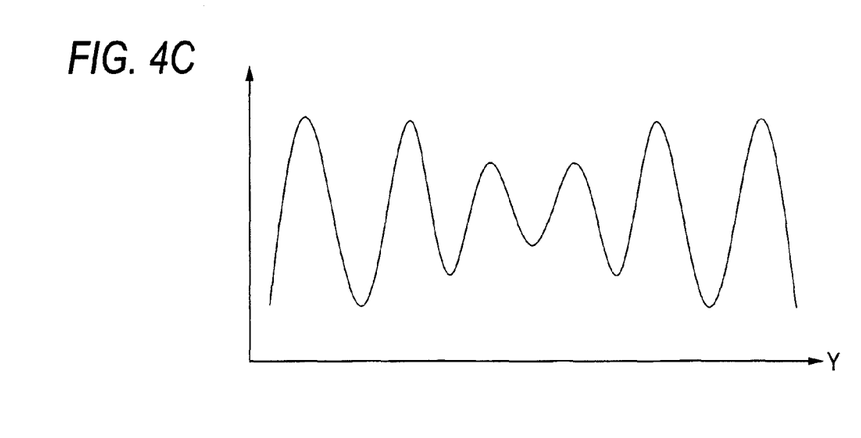

FIGS. 4A, 4B and 4C show explanatory diagrams of specific examples of arithmetic operation for obtaining a degree of difference. In FIG. 4A, in a horizontal direction (set as an X-axis direction) or a vertical direction (set as a Y-axis direction) of a raster image of a form (registered form or to-be-processed form), the total number of black pixels in each direction perpendicular to the X-axis or the Y-axis is counted and the counted total number is set as a projection value on a corresponding X- or Y-coordinate. When the raster image is a gray scale (multivalued) or color image, the total sum of pixel values is set as the projection value. In the example of FIG. 4B, such projection values in directions perpendicular to the Y-axis are used to form a waveform consisting of a group of isolated square waves based on the projection values corresponding to Y-coordinates. Such waveforms are formed about both the raster images of the registered form and the to-be-processed form respectively. Next, as shown in FIG. 4C, each waveform is low-pass-filtered to obtain a filtered waveform. A correlation coefficient between the filtered waveforms of the two raster images is obtained as a degree of difference. The arithmetic operation of the degree of difference is not limited to the aforementioned method. The degree of difference may be computed by another method if identity between the registered form and the to-be-processed form can be determined. In addition, the feature value of each registered form may be computed in advance and stored in the storage unit such as the hard disk drive 22 when the form is registered by the form registration portion 28.

Return to FIG. 3. The candidate registered form extracting portion 34 determines whether the degree of difference computed by the difference degree computing portion 32 is smaller than the threshold set by the threshold setting portion 30 or not. Thus, registered forms for which the contents of form processing executable on the to-be-processed form have been set are extracted as candidate registered forms. That is, registered forms whose degrees of difference from the to-be-processed form are smaller than their corresponding thresholds are identified, and the registered forms are extracted as candidate registered forms for which the contents of form processing executable on the to-be-processed form have been set. When the number of extracted candidate registered forms is one, the execution instruction portion 38 which will be described later outputs, to the form processing apparatus 104, instruction information indicating that the content of form processing set in the candidate registered form should be executed on the to-be-processed form. On the other hand, when a plurality of candidate registered forms are extracted based on the degrees of difference and the thresholds, the candidate registered form extracting portion 34 presents the candidate registered forms to the user on the display unit 20 or the like, so that a registered form whose content of form processing should be executed on the to-be-processed form can be selected based on instruction information inputted by the user. Specifically, the candidate registered forms are displayed on the display unit 20 or the like, and the user is urged to input an instruction to specify a registered form for which the content of form processing to be executed has been set. Based on the instruction information inputted from the input unit 18 by the user, a registered form for which the content of form processing executable has been set is selected. When no candidate registered form is extracted, information showing that form processing cannot be executed is given to the user through the display unit 20 or the like.

The display portion 36 controls the display unit 20 to display the to-be-processed form and so on based on an instruction from the candidate registered extracting portion 34 and so on.

When the number of candidate registered forms extracted by the candidate registered form extracting portion 34 is one, the execution instruction portion 38 outputs, to the form processing apparatus 104, instruction information showing that the content of form processing set in the candidate registered form should be executed on the to-be-processed form. On the other hand, when there is a registered form selected by the candidate registered form extracting portion 34 based on an instruction input of the user, the execution instruction portion 38 outputs, to the form processing apparatus 104, instruction information showing that the content of form processing set in the registered form should be executed on the to-be-processed form.

Figure 5A:
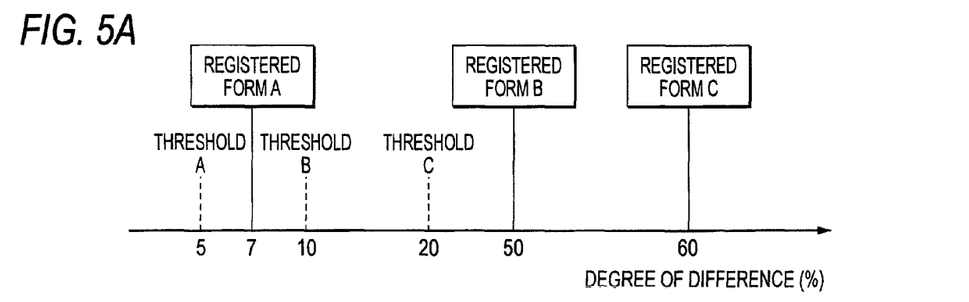
FIGS. 5A to 5D are explanatory diagrams of examples of operations of the form identification apparatus.
Figure 5B:
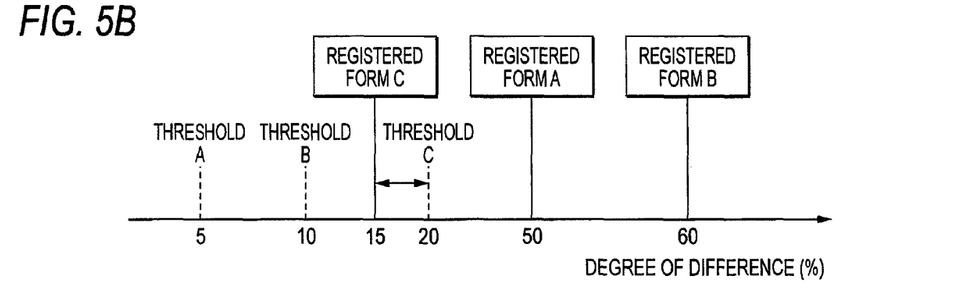
Figure 5C:
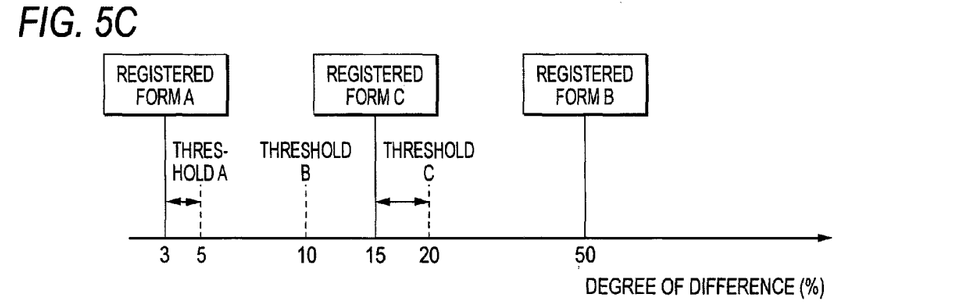

FIGS. 5A to 5C show explanatory diagrams showing operation examples of the form identification apparatus 100 according to a first exemplary embodiment. In the examples of FIGS. 5A to 5C, the abscissa designates a degree of difference, and degrees of difference between an image of a to-be-processed form read by the form reading apparatus 102 and images of registered forms A, B and C stored in the storage unit such as the hard disk drive 22 by the form registration portion 28 are shown as "registered form A", "registered form B" and "registered form C" respectively.

Assume that the registered form A is, for example, a bill and the content of form processing set in the registered form A implies e-mail transmission to an external customer. In addition, assume that a threshold A (for example, 5%) is set for determining the degree of difference between the registered form A and the to-be-processed form. Assume that the registered form B is, for example, a conference proceeding and the content of form processing set in the registered form B implies storage into a shared folder. In addition, assume that a threshold B (for example, 10%) is set for determining the degree of difference between the registered form B and the to-be-processed form. Assume that the registered form C is, for example, a collected questionnaire and the content of form processing set in the registered form C implies storage into a private folder. In addition, assume that a threshold C (for example, 20%) is set for determining the degree of difference between the registered form C and the to-be-processed form.

Generally, the level of safety required for the content of form processing implying e-mail transmission to the outside is high, while the level of safety required for the content of form processing implying storage into a private folder is low. The level of safety required for the content of form processing implying storage into a shared folder is set to be lower than that of the e-mail transmission and higher than that of the storage into a private folder. Thus, the magnitude relation among the thresholds A, B and C can be expressed by threshold A<threshold B<threshold C as described above.

The example of FIG. 5A shows the case where the degree of difference between the to-be-processed form read by the form reading apparatus 102 and the registered form A is 7%, the degree of difference between the to-be-processed form and the registered form B is 50%, and the degree of difference between the to-be-processed form and the registered form C is 60%. In this case, there is no registered form whose degree of difference is smaller than its corresponding threshold A, B, C. Thus, the candidate registered form extracting portion 34 cannot extract a candidate registered form, and any form processing is not executed on the to-be-processed form. In this case, the candidate registered form extracting portion 34 gives, to the user through the display unit 20 or the like, information showing that any form processing cannot be executed.

The example of FIG. 5B shows the case where the degree of difference between the to-be-processed form read by the form reading apparatus 102 and the registered form A is 50%, the degree of difference between the to-be-processed form and the registered form B is 60%, and the degree of difference between the to-be-processed form and the registered form C is 15%. In this case, only the degree of difference between the to-be-processed form and the registered form C is smaller than 20%, which is a value corresponding to the threshold C. Thus, the candidate registered form extracting portion 34 extracts the registered form C as a candidate registered form. The execution instruction portion 38 outputs, to the form processing apparatus 104, instruction information showing that the content of form processing set in the registered form C which is the candidate registered form should be executed on the to-be-processed form.

The example of FIG. 5C shows the case where the degree of difference between the to-be-processed form read by the form reading apparatus 102 and the registered form A is 3%, the degree of difference between the to-be-processed form and the registered form B is 50%, and the degree of difference between the to-be-processed form and the registered form C is 15%. In this case, both the degree of difference between the to-be-processed form and the registered form A and the degree of difference between the to-be-processed form and the registered form C are smaller than their corresponding thresholds A and C respectively. Thus, the candidate registered form extracting portion 34 extracts both the registered forms A and C as candidate registered forms, and shows images of the registered forms A and C to the user on the display unit 20 or the like. Based on instruction information inputted by the user, one of the registered forms A and C is selected as a registered form whose content of form processing should be executed on the to-be-processed form.

Figure 6:
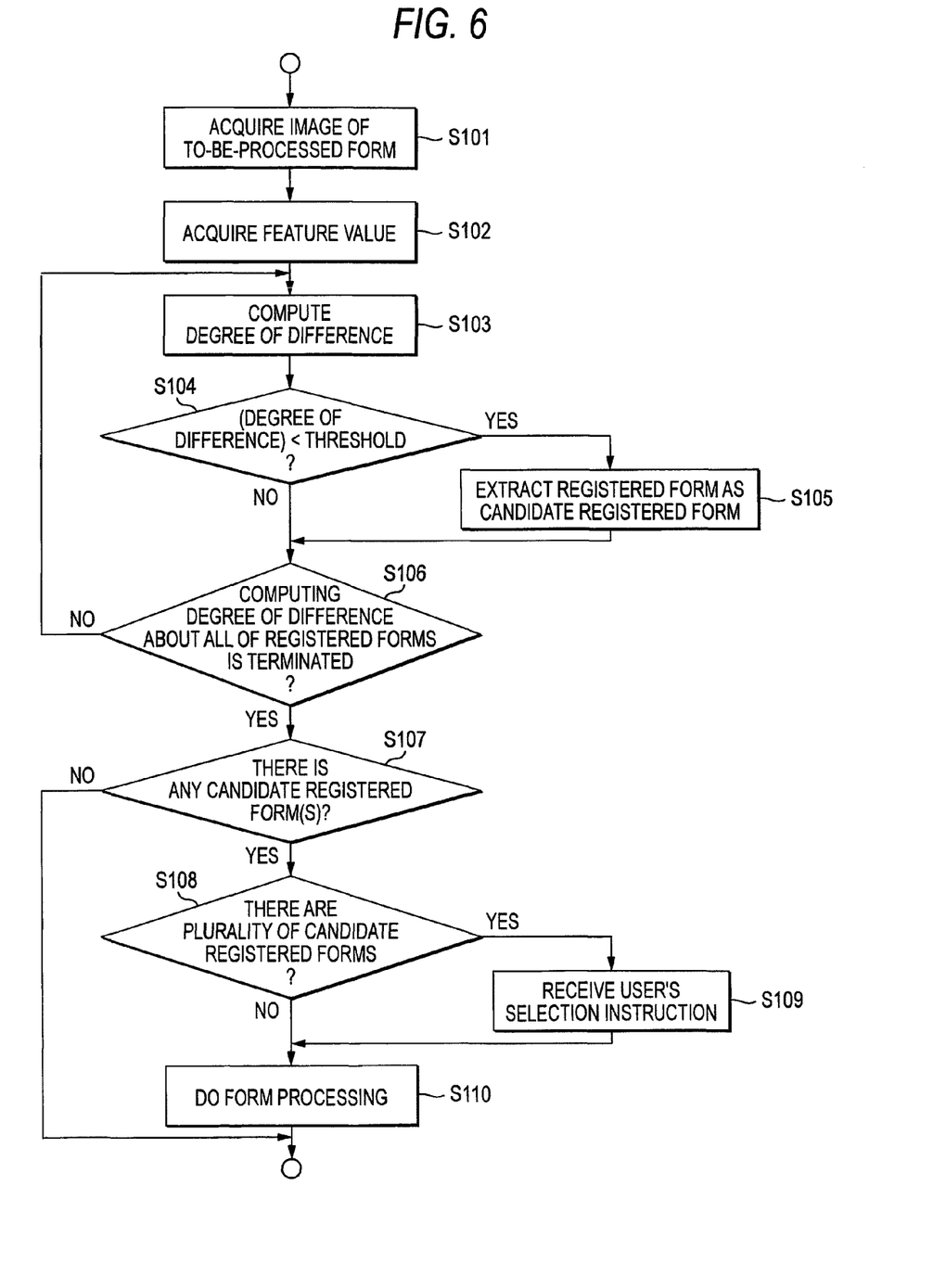
FIG. 6 is a flow chart of an example of operation of a form identification apparatus according to a first exemplary embodiment.

FIG. 6 shows a flow of an operation example of the form identification apparatus 100 according to the first exemplary embodiment. In FIG. 6, image data (raster images) of registered forms are stored in the storage unit such as the hard disk drive 22 together with the contents of form processing thereof by the form registration portion 28 in advance. In addition, thresholds for determining degrees of difference are set by the threshold setting portion 30 and stored in the storage unit such as the hard disk drive 22 in advance. Further, the feature values of the registered forms are computed by the difference degree computing portion 32 and stored in the storage unit such as the hard disk drive 22 in advance.

In FIG. 6, a raster image generated from a to-be-processed form read by the form reading apparatus 102 is acquired by the difference degree computing portion 32 (S101). The difference degree computing portion 32 obtains a feature value from the raster image of the to-be-processed form acquired in S101 (S102). Next, the difference degree computing portion 32 compares the feature value obtained in S102 with a feature value of one of the registered forms registered in advance, and computes a degree of difference between the registered form and the to-be-processed form (S103).

The candidate registered form extracting portion 34 determines whether a degree of difference computed by the difference degree computing portion 32 is smaller than a threshold set for each registered form by the threshold setting portion 30 or not (S104). When the degree of difference is smaller than the threshold in S104, the candidate registered form extracting portion 34 extracts the registered form as a candidate registered form for which the content of form processing executable on the to-be-processed is set (S105). When the degree of difference is not smaller than the threshold in S104 or after the candidate registered form is extracted in S105, it is determined whether computing the degrees of difference between all the registered forms and the to-be-processed form is terminated or not (S106). When the computing is not terminated, processing in and after S103 is repeated.

On the contrary, when computing the degrees of difference about all the registered forms is terminated in S106, the candidate registered form extracting portion 34 determines whether there is any candidate registered form (s) extracted in S105 or not (S107). When there is no candidate registered form, information showing that form processing cannot be executed is given to the user on the display unit 20 or the like, and processing is terminated. On the other hand, when there is any candidate registered form (s), it is determined whether there are a plurality of candidate registered forms or not (S108). When there are a plurality of candidate registered forms, the candidate registered form extracting portion 34 makes the display portion 36 display images of the candidate registered forms on the display unit 20, and inquires of the user which candidate registered form has the content of form processing the user wants to execute. When the user selects a candidate registered form having the content of form processing the user wants to execute, and inputs instruction information of the selection from the input unit 18 (S109), the candidate registered form extracting portion 34 selects the specified candidate registered form as a registered form whose content of form processing can be executed. The execution instruction portion 38 outputs, to the form processing apparatus 104, instruction information showing that the content of form processing set in the registered form selected by the candidate registered form extracting portion 34 based on the instruction input of the user should be executed on the to-be-processed form. Thus, the form processing apparatus 104 executes the form processing on the to-be-processed form (S110).

On the other hand, when the number of candidate registered forms is one in S108, the execution instruction portion 38 outputs, to the form processing apparatus 104, instruction information showing that the content of form processing set in the candidate registered form should be executed on the to-be-processed form. Thus, the form processing apparatus 104 executes the form processing on the to-be-processed form (S110).

A program for executing the aforementioned steps of FIG. 6 can be stored in a recording medium, or may be provided by a communication means. In that case, for example, the aforementioned program may be regarded as an invention "computer-readable recording medium in which a program is recorded" or an invention "data signal".

Second Exemplary Embodiment

A second exemplary embodiment is a modification in a case where the degree of difference of any registered form is not smaller than a threshold corresponding thereto, and the candidate registered form extracting portion 34 cannot extract any candidate registered form. In this case, the candidate registered form extracting portion 34 displays, as candidate registered forms, registered forms decided based on redetermination thresholds set by the threshold setting portion 30 in advance, and presents the candidate registered forms to the user. The execution instruction portion 38 determines whether to output, to the form processing apparatus 104, instruction information showing that the content of form processing set in a candidate registered form decided by the redetermination threshold based on instruction information inputted from the input unit 18 by the user should be executed on the to-be-processed form.

The redetermination thresholds are thresholds with which a registered form the closest to the to-be-processed form can be re-extracted as a candidate registered form when the candidate registered form extracting portion 34 cannot extract any candidate registered form. The redetermination thresholds are set by the threshold setting portion 30 based on values inputted from the input unit 18 by the user.

Figure 7:
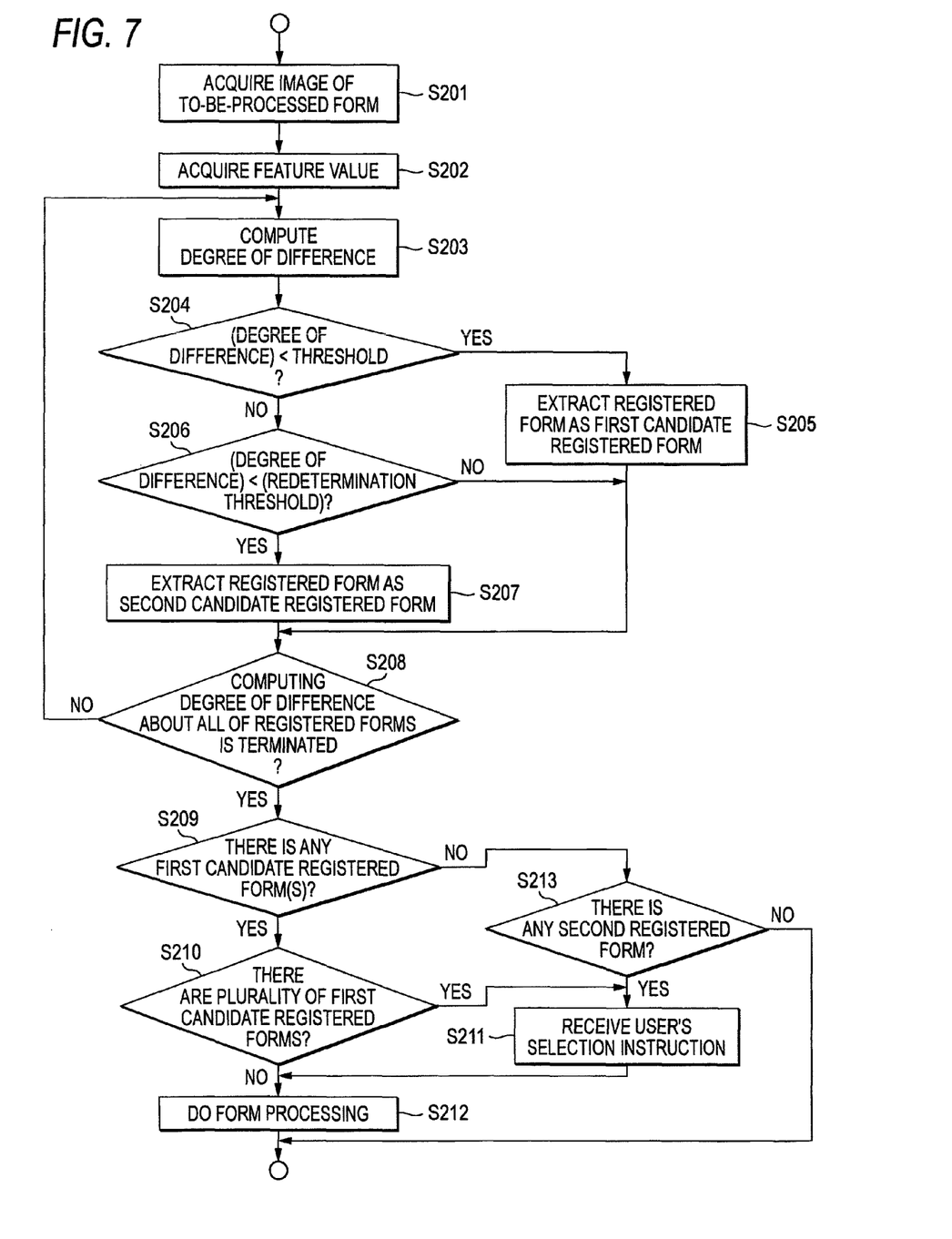
FIG. 7 is a flow chart of an example of operation of a form identification apparatus according to a second exemplary embodiment.

FIG. 7 shows a flow of an operation example of the form identification apparatus 100 according to the second exemplary embodiment. Also in FIG. 7, image data (raster images) of registered forms are stored in the storage unit such as the hard disk drive 22 together with the contents of form processing thereof by the form registration portion 28 in advance. In addition, thresholds and redetermination thresholds for determining and redetermining degrees of difference are set by the threshold setting portion 30 and stored in the storage unit such as the hard disk drive 22 in advance. Further, the feature values of the registered forms are computed by the difference degree computing portion 32 and stored in the storage unit such as the hard disk drive 22 in advance.

In FIG. 7, a raster image generated from a to-be-processed form read by the form reading apparatus 102 is acquired by the difference degree computing portion 32 (S201). The difference degree computing portion 32 obtains a feature value from the raster image of the to-be-processed form acquired in S201 (S202). Next, the difference degree computing portion 32 compares the feature value obtained in S202 with a feature value of one of the registered forms registered in advance, and computes a degree of difference between the registered form and the to-be-processed form (S203).

The candidate registered form extracting portion 34 determines whether a degree of difference computed by the difference degree computing portion 32 is smaller than a threshold set for each registered form by the threshold setting portion 30 or not (S204). When the degree of difference is smaller than the threshold in S204, the candidate registered form extracting portion 34 extracts the registered form as a first candidate registered form for which the content of form processing executable on the to-be-processed is set (S205).

On the contrary, when the degree of difference is not smaller than the threshold in S204, the candidate registered form extracting portion 34 determines whether the degree of difference is smaller than a redetermination threshold set by the threshold setting portion 30 or not (S206). When the degree of difference is smaller than the redetermination threshold, the candidate registered form extracting portion 34 extracts the registered form as a second candidate registered form whose form processing should be determined to be good or not by the user (S207).

When the first candidate registered form is extracted in S205 or when the degree of difference is not smaller than the redetermination threshold in S206 or when the second candidate registered form is extracted in S207, it is determined whether computing the degrees of difference between all the registered forms and the to-be-processed form is terminated or not (S208). When the computing is not terminated, processing in and after S203 is repeated.

On the contrary, when computing the degrees of difference about all the registered forms is terminated in S208, the candidate registered form extracting portion 34 determines whether there is any first candidate registered form(s) extracted in S205 or not (S209). When there is any first candidate registered form (s), the candidate registered form extracting portion 34 determines whether there are a plurality of first candidate registered forms or not (S210). When there are a plurality of first candidate registered forms, the candidate registered form extracting portion 34 makes the display portion 36 display images of the first candidate registered forms on the display unit 20, and inquires of the user which candidate registered form has the content of form processing the user wants to execute. When the user selects a candidate registered form having the content of form processing the user wants to execute, and inputs instruction information of the selection from the input unit 18 (S211), the candidate registered form extracting portion 34 selects the specified first candidate registered form as a registered form whose content of form processing can be executed. The execution instruction portion 38 outputs, to the form processing apparatus 104, instruction information showing that the content of form processing set in the registered form selected by the candidate registered form extracting portion 34 based on the instruction input of the user should be executed on the to-be-processed form. On the other hand, when the number of first candidate registered forms is one in S210, the execution instruction portion 38 outputs, to the form processing apparatus 104, instruction information showing that the content of form processing set in the first candidate registered form should be executed on the to-be-processed form. Thus, the form processing apparatus 104 executes the form processing on the to-be-processed form (S212).

On the other hand, when there is no first candidate registered form in S209, the candidate registered form extracting portion 34 determines whether there is a second candidate registered form extracted in S207 or not (S213). When there is a second candidate registered form in S213, the candidate registered form extracting portion 34 displays the second candidate registered form on the display unit 20, and inquires of the user whether the content of form processing set in the second candidate registered form should be executed or not. When the user inputs, from the input unit 18, instruction information showing that the content of form processing set in the second candidate registered form should be executed (S211), the execution instruction portion 38 outputs, to the form processing apparatus 104, instruction information showing that the content of form processing set in the second candidate registered form should be executed on the to-be-processed form. Thus, the form processing apparatus 104 executes the form processing on the to-be-processed form (S212). When there is no second candidate registered form in S213, processing is terminated.

In the example of FIG. 5A, there is no registered form whose degree of difference between any registered form A, B, C and the to-be-processed form is smaller than its corresponding threshold A, B, C. Thus, the candidate registered form extracting portion 34 extracts a second candidate registered form based on the aforementioned redetermination threshold. When the redetermination threshold is 30% for example, the registered form A is extracted as a second candidate registered form.

A program for executing the aforementioned steps of FIG. 7 can be stored in a recording medium, or may be provided by a communication means. In that case, for example, the aforementioned program may be regarded as an invention "computer-readable recording medium in which a program is recorded" or an invention "data signal".

Third Exemplary Embodiment

According to a third exemplary embodiment, the candidate registered form extracting portion 34 extracts a registered form with the smallest degree of difference as a candidate registered form without resort to instruction information from the user. The execution instruction portion 38 outputs, to the form processing apparatus 104, instruction information showing that the content of form processing set in the candidate registered form should be executed on the to-be-processed form.

Figure 8:
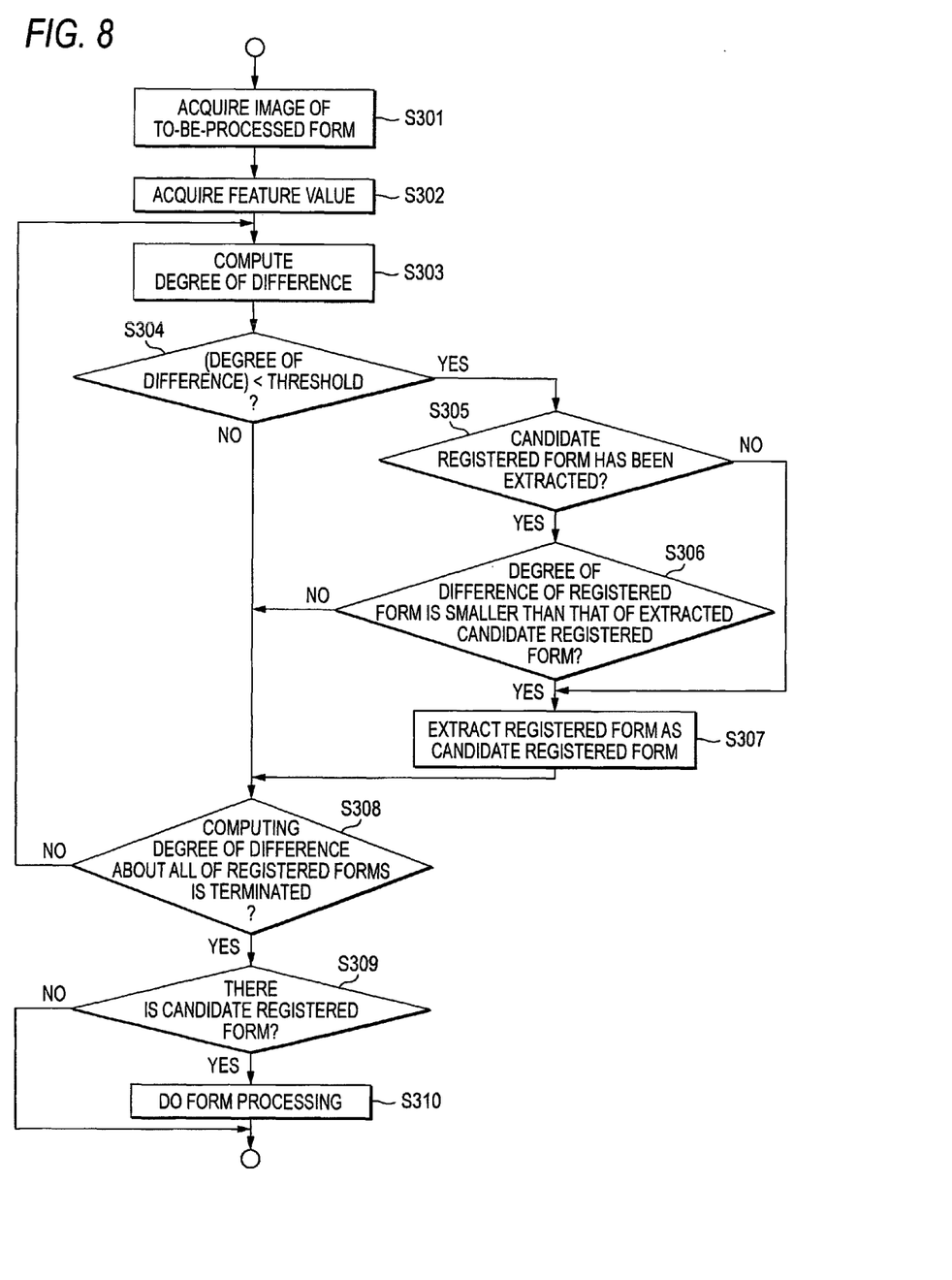
FIG. 8 is a flow chart of an example of operation of a form identification apparatus according to a third exemplary embodiment.

FIG. 8 shows a flow of an operation example of the form identification apparatus 100 according to the third exemplary embodiment. Also in FIG. 8, image data (raster images) of registered forms are stored in the storage unit such as the hard disk drive 22 together with the contents of form processing thereof by the form registration portion 28 in advance. In addition, thresholds for determining degrees of difference are set by the threshold setting portion 30 and stored in the storage unit such as the hard disk drive 22 in advance. Further, the feature values of the registered forms are computed by the difference degree computing portion 32 and stored in the storage unit such as the hard disk drive 22 in advance.

In FIG. 8, a raster image generated from a to-be-processed form read by the form reading apparatus 102 is acquired by the difference degree computing portion 32 (S301). The difference degree computing portion 32 obtains a feature value from the raster image of the to-be-processed form acquired in S301 (S302). Next, the difference degree computing portion 32 compares the feature value obtained in S302 with a feature value of one of the registered forms registered in advance, and computes a degree of difference between the registered form and the to-be-processed form (S303).

The candidate registered form extracting portion 34 determines whether a degree of difference computed by the difference degree computing portion 32 is smaller than a threshold set for each registered form by the threshold setting portion 30 or not (S304). When the degree of difference is smaller than the threshold in S304, the candidate registered form extracting portion 34 determines whether a candidate registered form has been extracted or not (S305). When a candidate registered form has been extracted, the candidate registered form extracting portion 34 determines whether the degree of difference of the registered form determined to be smaller than the threshold in S304 is smaller than the degree of difference of the extracted candidate registered form or not (S306). When the degree of difference of the registered form is smaller than the degree of difference of the extracted candidate registered form, the candidate registered form extracting portion 34 extracts the registered form as a new candidate registered form (S307).

When no candidate registered form has been extracted yet in S305, the registered form whose degree of difference is determined to be smaller than the threshold in S304 is extracted as a new candidate registered form (S307).

Next, when the degree of difference computed by the difference degree computing portion 32 is not smaller than the threshold in S304, or when the degree of difference of the registered form determined to be smaller than the threshold in S304 is not smaller than the degree of difference of the extracted candidate registered form in S306, or when the registered form is extracted as a new candidate registered form in S307, it is determined whether computing the degrees of difference between all the registered forms and the to-be-processed form is terminated or not (S308). When the computing is not terminated, processing in and after S303 is repeated.

On the contrary, when computing the degrees of difference about all the registered forms is terminated in S308, the candidate registered form extracting portion 34 determines whether there is a candidate registered form extracted in S307 or not (S309). When there is no candidate registered form, processing is terminated. On the contrary, when there is a candidate registered form, the candidate registered form is one of the registered forms registered in advance, with the smallest one of all the degrees of difference from the to-be-processed form. The execution instruction portion 38 outputs, to the form processing apparatus 104, instruction information showing that the content of form processing set in the candidate registered form should be executed on the to-be-processed form. Thus, the form processing apparatus 104 executes the form processing on the to-be-processed form (S310).

In the example of FIG. 5C, the degrees of difference between the to-be-processed form and the registered forms A and C are smaller than the thresholds A and C respectively. The candidate registered form extracting portion 34 extracts, of the registered forms A and C, the registered form A whose degree of difference is the smallest, as a candidate registered form. The execution instruction portion 38 outputs, to the form processing apparatus 104, instruction information showing that the content of form processing set in the registered form A should be executed on the to-be-processed form.

A program for executing the aforementioned steps of FIG. 8 can be stored in a recording medium, or may be provided by a communication means. In that case, for example, the aforementioned program may be regarded as an invention "computer readable medium storing the program" or an invention "data signal".

Fourth Exemplary Embodiment

In a fourth exemplary embodiment, any registered form whose degree of difference is smaller than a first threshold is regarded as a first registered form, and any registered form whose degree of difference is not smaller than a second threshold smaller than the first threshold but is smaller than that of the first registered form is regarded as a second registered form. When there are such a first registered form and such a second registered form, the candidate registered form extracting portion 34 displays those registered forms as candidate registered forms on the display unit 20 and presents the candidate registered forms to the user. In this case, based on instruction information inputted from the input unit 18 by the user, the execution instruction portion 38 outputs, to the form processing apparatus 104, instruction information showing that the content of form processing set in one of the first and second registered forms should be executed on the to-be-processed form.

Figure 5D:
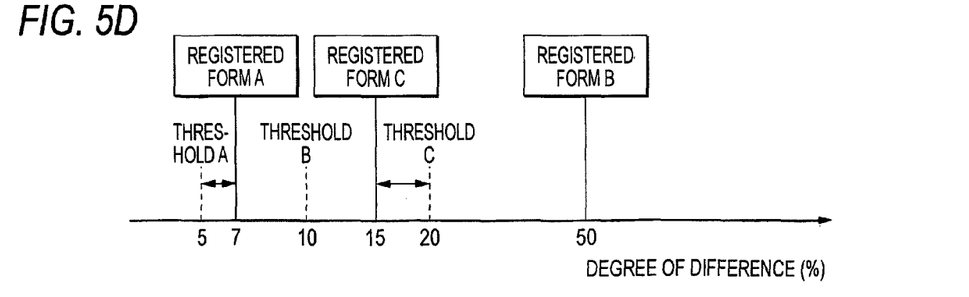

FIG. 5D shows an explanatory diagram of an operation example of the form identification apparatus 100 according to the fourth exemplary embodiment, in which the degree of difference between a to-be-processed form read by the form reading apparatus 102 and a registered form A is 7%, the degree of difference between the to-be-processed form and a registered form B is 50%, and the degree of difference between the to-be-processed form and a registered form C is 15%. In this example, the registered form C is a first registered form, and a threshold C set for the registered form C is a first threshold. In addition, the registered form A is a second registered form, and a threshold A set for the registered form A is a second threshold. In the fourth exemplary embodiment, the candidate registered form extracting portion 34 presents the registered forms A and C to the user, and the execution instruction portion 38 gives, to the form processing apparatus 104, an instruction to execute the content of form processing set in one of the registered forms based on instruction information of the user.

Figure 9:
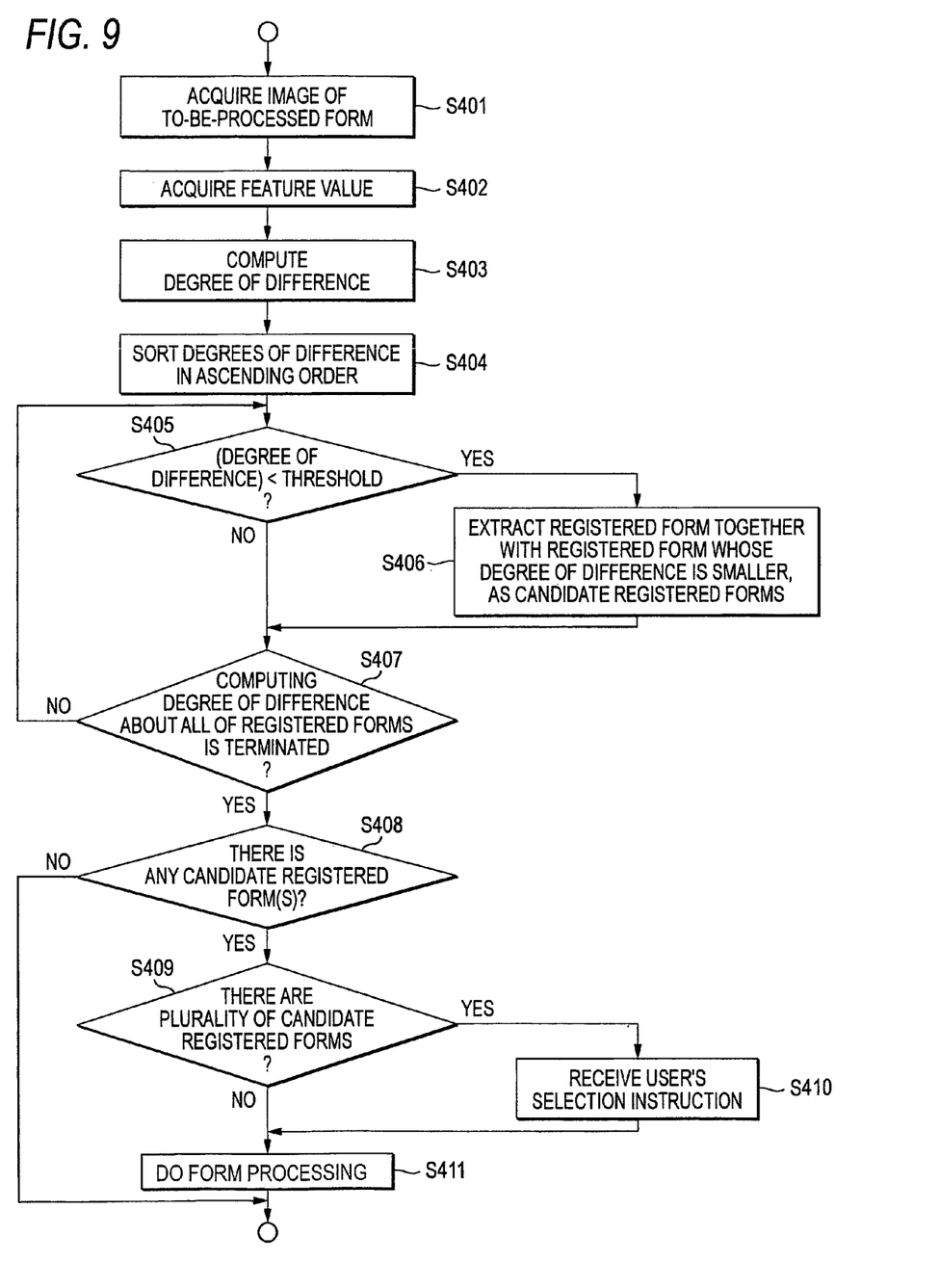
FIG. 9 is a flow chart of an example of operation of a form identification apparatus according to a fourth exemplary embodiment.

FIG. 9 shows a flow of an operation example of the form identification apparatus 100 according to the fourth exemplary embodiment. Also in FIG. 9, image data (raster images) of registered forms are stored in the storage unit such as the hard disk drive 22 together with the contents of form processing thereof by the form registration portion 28 in advance. In addition, thresholds for determining degrees of difference are set by the threshold setting portion 30 and stored in the storage unit such as the hard disk drive 22 in advance. Further, the feature values of the registered forms are computed by the difference degree computing portion 32 and stored in the storage unit such as the hard disk drive 22 in advance.

In FIG. 9, a raster image generated from a to-be-processed form read by the form reading apparatus 102 is acquired by the difference degree computing portion 32 (S401). The difference degree computing portion 32 obtains a feature value from the raster image of the to-be-processed form acquired in S401 (S402). Next, the difference degree computing portion 32 compares the feature value obtained in S402 with a feature value of each of the registered forms registered in advance, and computes a degree of difference between the registered form and the to-be-processed form (S403).

The candidate registered form extracting portion 34 sorts the computed degrees of difference between all the registered forms and the to-be-processed form in ascending order, and stores them in the storage unit such as the hard disk drive 22 (S404). Incidentally, the degrees of difference may be sorted not in ascending order but in descending order.

Next, the candidate registered form extracting portion 34 determines whether a degree of difference between one registered form and the to-be-processed form computed by the difference degree computing portion 32 is smaller than a threshold set for the registered form by the threshold setting portion 30 or not (S405). When the degree of difference is smaller than the threshold in S405, the candidate registered form extracting portion 34 extracts the registered form as a first registered form. On this occasion, with reference to the degrees of difference sorted in ascending order in S404, another registered form whose degree of difference is smaller than the degree of difference of the first registered form is extracted as a second registered form together with the first registered form (S406). The first and second registered forms serve as candidate registered forms. Incidentally, a plurality of registered forms may be extracted as second registered forms.

Next, the candidate registered form extracting portion 34 determines whether processing for extracting candidate registered forms based on the degrees of difference of all the registered forms in S405 and 5406 is terminated or not (S407). When processing for extracting candidate registered forms based on the degrees of difference of all the registered forms in S405 and 5406 is not terminated, processing in and after S405 is repeated.

On the other hand, when the extraction processing is terminated in S407, the candidate registered form extracting portion 34 determines whether there is any candidate registered form (s) (first and second registered forms) extracted in S406 or not (S408). When there is no candidate registered form, processing is terminated. On the contrary, when there are any candidate registered forms, the candidate registered form extracting portion 34 determines whether there are a plurality of candidate registered forms or not (S409). When there are a plurality of candidate registered forms, the candidate registered form extracting portion 34 makes the display portion 36 display images of the candidate registered forms on the display unit 20, and inquires of the user which candidate registered form has the content of form processing the user wants to execute. When the user selects a candidate registered form having the content of form processing the user wants to execute, and inputs instruction information of the selection from the input unit 18 (S410), the candidate registered form extracting portion 34 selects the specified candidate registered form as a registered form whose content of form processing can be executed. The execution instruction portion 38 outputs, to the form processing apparatus 104, instruction information showing that the content of form processing set in the registered form selected by the candidate registered form extracting portion 34 based on the instruction input of the user should be executed on the to-be-processed form. Thus, the form processing apparatus 104 executes the form processing on the to-be-processed form (S411).

On the other hand, when the number of candidate registered forms is one in S409, the execution instruction portion 38 outputs, to the form processing apparatus 104, instruction information showing that the content of form processing set in the candidate registered form should be executed on the to-be-processed form so that the form processing apparatus 104 executes the form processing on the to-be-processed form (S411).

A program for executing the aforementioned steps of FIG. 9 can be stored in a recording medium, or may be provided by a communication means. In that case, for example, the aforementioned program may be regarded as an invention "computer-readable recording medium in which a program is recorded" or an invention "data signal".

Fifth Exemplary Embodiment

According to a fifth exemplary embodiment, a threshold for determining a degree of difference between each registered form and a to-be-processed form is decided in advance in accordance with the level of safety required for form processing set in the registered form, and a threshold table where contents of form processing are associated with thresholds respectively is stored in a storage unit such as the hard disk drive 22 in advance. The threshold setting portion 30 decides a threshold for each registered form in accordance with the content of form processing set therein, with reference to the threshold table when the form registration portion 28 performs processing for registration of the registered form.

In the threshold table, thresholds are not associated with contents of form processing respectively, but levels of safety required for the contents of form processing may be classified into "high", "medium" and "low" by way of example, so that three levels of thresholds can be set correspondingly to the classified levels of safety. For example, assume that the threshold is set as 5% when the level of safety required for the content of form processing is "high", as 10% when the level of safety required for the content of form processing is "medium", and as 20% when the level of safety required for the content of form processing is "low". In this case, the threshold is set as 5% for a registered form A where the content of form processing with a "high" level of safety required therefor is set, the threshold is set as 10% for a registered form B where the content of form processing with a "medium" level of safety required therefor is set, and the threshold is set as 20% for a registered form C where the content of form processing with a "low" level of safety required therefor is set.

Figure 10:
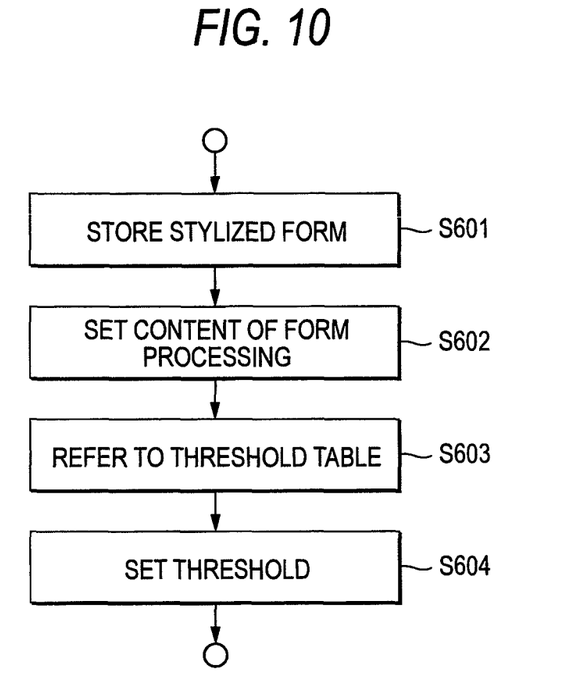
FIG. 10 is a flow chart of an example of operation of a form identification apparatus according to a fifth exemplary embodiment.

FIG. 10 shows a flow of an operation example of the form identification apparatus 100 according to the fifth exemplary embodiment. In FIG. 10, the form registration portion 28 registers a stylized form to be processed. That is, the form registration portion 28 acquires a raster image generated from the stylized form read as a registration target by the form reading apparatus 102, and stores the raster image into a storage unit such as the hard disk drive 22 (S601). In addition, the form registration portion 28 sets content of form processing for the registered form based on user's instruction or the like (S602).

Next, the threshold setting portion 30 refers to the threshold table where contents of form processing are associated with thresholds respectively (S603), reads a threshold associated with the content of form processing set by the form registration portion 28, and stores the threshold into the storage unit such as the hard disk drive 22 together with the raster image of the registered form and the content of form processing (S604).

A program for executing the aforementioned steps of FIG. 10 can be stored in a recording medium, or may be provided by a communication means. In that case, for example, the aforementioned program may be regarded as an invention "computer-readable recording medium in which a program is recorded" or an invention "data signal".

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A form identification apparatus comprising:
a memory; and
a processor, the processor functioning as:
a form registration unit that stores stylized forms as registered forms in the memory, and associates with each of the registered forms a type of form processing to be performed on the registered form and a degree of difference threshold based on the type of the form processing in the memory, wherein the registered forms are a plurality of forms associated with one of types of form processing to be performed on the registered forms and one of degrees of difference thresholds based on the one of the types of form processings;
a difference degree computing portion that respectively compares an input form to the registered forms and determines degrees of difference between the input form and the registered forms based on results of the comparing;

a candidate registered form extracting unit that determines whether the degrees of difference between the input form and the registered forms are less than the degree of difference threshold, extracts from the memory, as a candidate registered form, at least one registered form among the registered forms in response to determining that the degree of difference between the input form and the registered form is less than the degree of difference threshold, and, if a plurality of candidate forms having the degrees of difference less than the degree of difference threshold are extracted from the memory, causes a display device to display the plurality of candidate forms for selection of one of the plurality of candidates forms displayed on the display device as the candidate registered form; and an execution unit that executes for the input form a form processing associated with the candidate registered form.

2. The form identification apparatus according to claim 1, wherein the candidate registered form extracting unit determines that the degrees of difference between the input form and the registered forms are greater than the degrees of difference thresholds and presents, to a user, the candidate registered form based on updated degrees of difference thresholds greater than the degrees of difference thresholds.

3. The form identification apparatus according to claim 1, wherein the candidate registered form extracting unit determines that plural degrees of difference between the input form and the registered forms are smaller than the degrees of difference thresholds, extracts from the memory as a plurality of candidate registered forms the registered forms having the plural degrees of difference between the input form and the plurality of forms smaller than the degrees of difference thresholds, presents the plurality of candidate registered forms to a user, and selects one of the plurality of registered forms whose type of form processing is executed on the input form, based on instruction information inputted by the user.

4. The form identification apparatus according to claim 1, wherein the candidate registered form extracting unit determines that plural degrees of difference between the input form and the plurality of forms are smaller than the degrees of difference thresholds, extracts from the memory as a plurality of candidate registered forms the registered forms having the plural degrees of difference between the input form and the plurality of forms smaller than the degrees of difference thresholds, and selects the candidate registered form whose degree of difference between the input form is the smallest, as the candidate registered form whose type of form processing is executed on the input form.

5. The form identification apparatus according to claim 1, wherein the candidate registered form extracting unit extracts from the memory, as a plurality of candidate registered forms, a first registered form whose degree of difference between the input form is smaller than a first degree of difference threshold and a second registered form whose degree of difference between the input form is not smaller than a second threshold smaller than the first threshold but is smaller than that of the first registered form, presents the plurality of candidate registered forms to a user, and selects one of the plurality of candidate registered forms whose type of form processing is executed on the input form, based on instruction information inputted by the user.

6. A form identification apparatus according to claim 1, wherein the degree of difference threshold is determined based on a level of security required for the type of form processing associated with the registered form.

7. A form processing system comprising:
a scanner that reads an input form;
a form identification apparatus, that stores stylized forms as registered forms in the memory, and associates with each of the registered forms a type of form processing to be performed on the registered form and a degree of difference threshold based on the type of the form processing in the memory, wherein the registered forms are a plurality of forms associated with one of types of form processing to be performed on the registered forms and one of degrees of difference thresholds based on the one of the types of form processings, acquires an image of the input form from the form reading apparatus, compares the image of the input form to the registered forms and determines degrees of difference between the input form and the registered forms based on results of the comparing, determines whether the degrees of difference between the input form and the registered forms are less than the degree of difference threshold, extracts from the memory, as a candidate form, at least one registered form among the registered forms in response to determining that the degree of difference between the input form and the registered form is less than the degree of difference threshold, and, if a plurality of candidate forms having the degrees of difference less than the degree of difference threshold are extracted from the memory, causes a display device to display the plurality of candidate forms for selection of one of the plurality of candidates forms displayed on the display device as the candidate registered form; and
a form processing apparatus that processes the input form in accordance with the type form processing associated with the candidate registered form.

8. A form processing method comprising:
storing stylized forms in a memory as registered forms, and associating with the registered forms a type of form processing to be performed on the form and a degree of difference threshold based on the type of the form processing in the memory, wherein the registered forms are a plurality of forms associated with one of types of form processing to be performed on the registered forms and one of degrees of difference thresholds based on the one of the types of form processings;
comparing an input form to the registered forms and determining degrees of difference between the input form and the registered forms based on results of the comparing;
determining whether the degrees of difference between the input form and the registered forms are less than the degree of difference threshold;
extracting from the memory, as a candidate registered form, at least one registered form among the registered forms in response to determining that the degree of difference between the input form and the registered form is less than the degree of difference threshold;
if a plurality of candidate forms having the degrees of difference less than the degree of difference threshold are extracted from the memory, displaying the plurality of candidate forms for selection of one of the plurality of candidates forms displayed on the display device as the candidate registered form; and
processing the input form in accordance with the type form processing associated with the candidate registered form.

9. A non-transitory computer readable recording medium storing a program causing a computer to execute a process for form processing, the process comprising:
- storing stylized forms in a memory as registered forms, and associating with the registered forms a type of form processing to be performed on the form and a degree of difference threshold based on the type of the form processing in the memory, wherein the registered forms are a plurality of forms associated with one of types of form processing to be performed on the registered forms and one of degrees of difference thresholds based on the one of the types of form processings;
- comparing an input form to the registered forms and determining degrees of difference between the input form and the registered forms based on results of the comparing;
- determining whether the degrees of difference between the input form and the registered forms are less than the degree of difference threshold;
- extracting from the memory, as a candidate registered form, at least one registered form among the registered forms in response to determining that the degree of difference between the input form and the registered form is less than the degree of difference threshold;
- if a plurality of candidate forms having the degrees of difference less than the degree of difference threshold are extracted from the memory, displaying the plurality of candidate forms for selection of one of the plurality of candidates forms displayed on the display device as the candidate registered form; and
- processing the input form in accordance with the type form processing associated with the candidate registered form.

10. The form identification apparatus according to claim 2, wherein the candidate registered form extracting unit, if a plurality of candidate forms are extracted having the degrees of difference less than the updated degrees of difference thresholds are extracted from the memory, causes the display device to display the plurality of candidate forms for selection of one of the plurality of candidate registered forms displayed on the display device as the candidate registered form.

11. The form identification apparatus according to claim 6, wherein the degree of difference threshold comprises a first degree of difference threshold and a second degree of difference threshold greater than the first degree of difference threshold, and
- wherein a first level of security corresponding to the first degree of difference threshold is higher than a second level of security corresponding to the second degree of difference threshold.

* * * * *